United States Patent
Mino

(10) Patent No.: US 8,178,164 B2
(45) Date of Patent: May 15, 2012

(54) METHOD OF FORMING ORGANIC MOLECULAR FILM STRUCTURE AND ORGANIC MOLECULAR FILM STRUCTURE

(75) Inventor: Norihisa Mino, Osaka (JP)

(73) Assignee: Panasonic Corporation, Osaka (JP)

( * ) Notice: Subject to any disclaimer, the term of this patent is extended or adjusted under 35 U.S.C. 154(b) by 795 days.

(21) Appl. No.: 12/296,489

(22) PCT Filed: Apr. 6, 2007

(86) PCT No.: PCT/JP2007/057731
§ 371 (c)(1),
(2), (4) Date: Oct. 8, 2008

(87) PCT Pub. No.: WO2007/119690
PCT Pub. Date: Oct. 25, 2007

(65) Prior Publication Data
US 2009/0053417 A1 Feb. 26, 2009

(30) Foreign Application Priority Data
Apr. 12, 2006 (JP) ................... 2006-110057

(51) Int. Cl.
| | |
|---|---|
| B05D 1/00 | (2006.01) |
| B05D 1/26 | (2006.01) |
| B05D 1/36 | (2006.01) |
| B05D 5/12 | (2006.01) |
| B05D 7/00 | (2006.01) |
| B05D 5/00 | (2006.01) |
| B05D 7/24 | (2006.01) |

(52) U.S. Cl. ........ 427/259; 427/256; 427/258; 427/261; 427/264; 427/270; 427/271; 427/272; 427/58; 427/74; 427/75; 427/77; 427/162; 427/164; 427/165; 428/411.1; 428/688; 428/689; 428/690; 428/917; 313/483; 313/498; 313/499; 313/502; 313/506

(58) Field of Classification Search .................. 427/256, 427/271, 258, 261, 264, 287, 58, 74, 96.1; 428/690, 917; 313/506; 257/40
See application file for complete search history.

(56) References Cited

U.S. PATENT DOCUMENTS
4,753,830 A * 6/1988 Matsuda et al. ........... 427/434.3
(Continued)

FOREIGN PATENT DOCUMENTS
EP 0 849 003 A1 6/1998
(Continued)

OTHER PUBLICATIONS

Heitzman et al., "Two-Dimensional Diffusion of Prodan on Self-Assembled Monolayers Studied by Fluorescence Recovery after Photobleaching", Journal of Physical Chemistry B, vol. 108, (2004), pp. 13764-13770.*

(Continued)

Primary Examiner — Michael Cleveland
Assistant Examiner — Lisha Jiang
(74) Attorney, Agent, or Firm — Harmre, Schumann, Mueller & Larson, P.C.

(57) ABSTRACT

The present invention provides a method for forming an organic molecular film structure that can maintain desired functions characteristic to the organic material and that can be realized as a thin film, and the organic molecular film structure. An organic molecular film structure forming method for forming an organic molecular film on a base material comprises the steps of: i) forming a monomolecular film (12) that contains first organic molecules (12a) by chemically bonding a surface of the base material (10) and the first organic molecules (12a); and ii) causing second organic molecules (15) to be present inside the monomolecular film (12) by bringing the second organic molecules (15) into contact with the monomolecular film (12). Accordingly, it is possible to form an organic molecular film that can maintain desired functions characteristic to the organic material and that can be realized as a thin film.

16 Claims, 4 Drawing Sheets

U.S. PATENT DOCUMENTS

| | | | |
|---|---|---|---|
| 4,869,930 A * | 9/1989 | Clarke et al. | 427/96.8 |
| 4,882,292 A | 11/1989 | Sudhölter et al. | |
| 5,035,782 A | 7/1991 | Tamura et al. | |
| 5,093,154 A | 3/1992 | Hatada et al. | |
| 5,246,740 A | 9/1993 | Mino et al. | |
| 5,461,166 A | 10/1995 | Mino et al. | |
| 5,851,726 A | 12/1998 | Ikuta et al. | |
| 6,310,199 B1 | 10/2001 | Smith et al. | |
| 2002/0011208 A1 * | 1/2002 | Ishida et al. | 118/666 |
| 2003/0117579 A1 | 6/2003 | Morris et al. | |
| 2006/0141156 A1 * | 6/2006 | Viel et al. | 427/258 |

FOREIGN PATENT DOCUMENTS

| | | |
|---|---|---|
| JP | 63-88439 | 4/1988 |
| JP | 63-141673 | 6/1988 |
| JP | 2-9478 | 1/1990 |
| JP | 2-71873 | 3/1990 |
| JP | 4-132637 | 5/1992 |
| JP | 4-214880 | 8/1992 |
| JP | 6-92971 | 4/1994 |
| JP | 8-192099 | 7/1996 |
| JP | 2564319 | 9/1996 |
| JP | 9-241008 | 9/1997 |
| JP | 7-48459 | 6/1998 |
| JP | 10-175267 | 6/1998 |
| JP | 2889768 | 2/1999 |
| JP | 2002-543979 | 12/2002 |
| JP | 2005-508708 | 4/2005 |
| JP | 2005-177533 | 7/2005 |
| JP | 2006-32636 | 2/2006 |

OTHER PUBLICATIONS

Yabe, A. et al. "An Instruction to Organic Ultra Thin Film", Baifukan, 1988, pp. 122-123.

"The Surface Science Society of Japan (ed.), New Edition: Basic and Applications of Surface Science", NTS, 2004, pp. 1137-1141.

* cited by examiner

US 8,178,164 B2

METHOD OF FORMING ORGANIC MOLECULAR FILM STRUCTURE AND ORGANIC MOLECULAR FILM STRUCTURE

TECHNICAL FIELD

The present invention relates to an organic molecular film structure forming method and an organic molecular film structure.

BACKGROUND ART

Organic molecular films are described in, for example, Non-Patent Documents 1 and 2 below. These documents identify a Langmuir-Blodgett (hereinafter, also referred to as 'LB') technique and a chemical adsorption-chemical bonding technique (self-assembled monolayer technique), as methods for forming organic molecular films with a film thickness of approximately 1 nm.

[Non-Patent Document 1] Akira Yabe, An Instruction to Organic Ultra Thin Film, Baifukan, 1988, p. 123.

[Non-Patent Document 2] The Surface Science Society of Japan (ed.), New Edition: Basic and Applications of Surface Science, NTS, 2004, p. 1137.

An organic molecular film is formed in order to achieve, in a thin film, desired functions characteristic to the organic material, for example, an electrical function such as light emission, light reception, electrical conduction, electrical insulation, electrical switching, generation of electrical energy, or electrical recording, and a chemical function such as reaction, surface improvement, substance separation, or substance storage. However, in these conventional configurations, in order to form an organic molecular film with a thickness of approximately 1 nm, the organic material additionally has to be provided with a function for realizing a thin film, in addition to the desired functions characteristic to the organic material. In the case of an LB film, for example, 'linear chain' and 'fatty acid' are necessary for the function for realizing a thin film. In the case of a self-assembled monolayer, for example, 'linear chain' and 'SH group' are necessary for the function for realizing a thin film.

Accordingly, there is the problem that an organic material used in a conventional organic molecular film has to be provided with at least three functional portions in an organic molecule. Also, it is highly conceivable that the properties necessary for realizing a thin film impair the desired functions characteristic to the organic material. Moreover, there is the problem that the cost of the film itself significantly increases because the cost for producing this sort of material significantly increases according to the number of functions that are to be provided.

DISCLOSURE OF INVENTION

The present invention is to solve the above-described problems, and it is an object thereof to provide a method for forming an organic molecular film structure that can maintain desired functions characteristic to the organic material and that can be realized as a thin film, and the organic molecular film structure.

The present invention is directed to an organic molecular film structure forming method for forming an organic molecular film on a base material, comprising the steps of:

i) forming on the base material a monomolecular film that contains first organic molecules by chemically bonding a surface of the base material and the first organic molecules; and ii) causing second organic molecules to be present inside the monomolecular film by bringing the second organic molecules into contact with the monomolecular film.

Moreover, the present invention is directed to an organic molecular film structure containing a base material and an organic molecular film that is formed on the base material, wherein the organic molecular film contains a monomolecular film that contains first organic molecules chemically bonded to a surface of the base material, and second organic molecules that are present inside the monomolecular film.

DESCRIPTION OF THE INVENTION

Figure 1A:
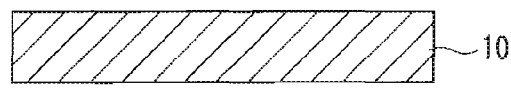
FIGS. 1A to 1E are cross-sectional views following the processing procedure, for illustrating an organic molecular film structure forming method according to an embodiment of the present invention.

An organic molecular film structure forming method of the present invention comprises the steps of i) forming on a base material a monomolecular film that contains first organic molecules by chemically bonding a surface of the base material and the first organic molecules; and ii) causing second organic molecules to be present inside the monomolecular film by bringing the second organic molecules into contact with the monomolecular film. In this method, after the monomolecular film that contains the first organic molecules is formed, the second organic molecules are caused to be present inside this monomolecular film. Accordingly, for example, when organic molecules having a function for realizing a thin film are selected as the first organic molecules and organic molecules having desired functions characteristic to the organic material are selected as the second organic molecules, it is possible to form an organic molecular film that can maintain desired functions characteristic to the organic material and that can be realized as a thin film. Moreover, it is possible to reduce the cost for producing the organic molecular film because a function for realizing a thin film and desired functions characteristic to the organic material do not have to be provided in the same organic molecules as in conventional examples. Also, it is possible to obtain an organic molecular film that easily can be realized as a thin film and has a uniform thickness because the film that is to be formed is a monomolecular film.

There is no specific limitation on the method for chemically bonding the surface of the base material and the first organic molecules in step i), but it is preferable in view of production cost that the surface of the base material and the first organic molecules are bonded chemically by bringing a solution in which the first organic molecules are dissolved and the base material into contact with each other.

Furthermore, in step i), the monomolecular film selectively may be formed on part of the surface of the base material. The reason for this is that functions can be provided selectively at desired locations on the base material. Examples of a method for selectively forming the monomolecular film include a method in which, after resist patterns are arranged on the base material by a known photolithography method, the monomolecular film that contains the first organic molecules is formed on the regions on the base material not covered by the resist patterns, and a method in which, after the monomolecular film that contains the first organic molecules is formed on the entire surface of the base material, only desired regions are covered by photomasks, and part of the first organic molecules are decomposed by irradiating the regions not covered by the photomasks with energy beams such as ultraviolet rays. In this case, the regions are irradiated with the energy beams preferably under an oxygen atmosphere because the first organic molecules can be decomposed efficiently.

There is no specific limitation on the method for causing the second organic molecules to be present inside the monomolecular film in step ii), but it is preferable in view of production cost that the second organic molecules are caused to be present inside the monomolecular film by dripping the second organic molecules or a solution in which the second organic molecules are dissolved onto the monomolecular film. At that time, means such as a spin coating method preferably is used in which the second organic molecules or the solution is dripped in a state where the monomolecular film is rotated because the second organic molecules can be caused to be present uniformly inside the monomolecular film.

In the present invention, steps i) and ii) may be performed using methods other than those described as examples above, such as an inkjet printing method or an application method using a dispenser. In any case, the production cost can be reduced relative to that in conventional methods (a vacuum evaporation method and the like).

It is preferable that the monomolecular film is a self-assembled monolayer of the first organic molecules. The reason for this is that a thin film can be formed more easily.

There is no specific limitation on the base material for forming the self-assembled monolayer, and it is possible to use, for example, glass, metals, ceramics, resins, and their compound materials. For example, if a base material (a base material made of glass, metals, ceramics, or the like) having a hydroxyl group on the surface is used as the base material, and organic molecules having a halogenosilane group, an alkoxysilane group, or the like are used as the first organic molecules, the monomolecular film is a self-assembled monolayer in which the base material and the first organic molecules are bonded by chemical bonding in the form of —Si—O—. Herein, the halogen of the halogenosilane group may be, for example, chlorine, bromine, or iodine. Examples of the first organic molecules having a halogenosilane group include octylchlorosilane, 3-(para-methoxyphenyl)propyltrichlorosilane, and acetoxypropylmethyldichlorosilane. The alkoxysilane group may be, for example, a methoxysilane group, an ethoxysilane group, or a butoxysilane group. Examples of the first organic molecules having an alkoxysilane group include octadecyltriethoxysilane, (9-carbazole)ethyltriethoxysilane, and 4-phenylbutyltrimethoxysilane. An example of the method for forming the self-assembled monolayer having the chemical bonding in the form of —Si—O— will be described later.

Furthermore, the self-assembled monolayer of the first organic molecules also can be formed by using a silicon substrate as the base material. In this case, for example, organic molecules having an alkene group can be used as the first organic molecules. In particular, organic molecules having —CH=CH$_2$ at a distal end preferably are used because a self-assembled monolayer having a uniform quality can be formed. Examples of the organic molecules having —CH=CH$_2$ at a distal end include 1-octadecene, and 7-phenyl-1-octene. Examples of the method for forming the self-assembled monolayer include a method in which the first organic molecules having an alkene group are brought into contact with a silicon substrate heated to 100 to 200° C. under a dry atmosphere (e.g., under an argon atmosphere). In this case, a self-assembled monolayer is obtained in which the substrate and the first organic molecules are bonded by chemical bonding in the form of —Si—C— through a thermal radical reaction.

It should be noted that the self-assembled monolayer in the present invention is not limited to those in the foregoing examples. For example, if a base material modified in advance with aminosilane is used as the base material, and octadecyltrichlorosilane is used as the first organic molecules, a self-assembled monolayer is obtained in which the base material and the first organic molecules are bonded by chemical bonding in the form of —Si—N—. Furthermore, if a base material modified in advance with silanethiol is used as the base material, and octadecyltriethoxysilane is used as the first organic molecules, a self-assembled monolayer is obtained in which the base material and the first organic molecules are bonded by chemical bonding in the form of —Si—S—. In addition to the above, resins such as polyamide resins and polyurethane resins also can be used as the base material.

As the second organic molecules, for example, organic molecules having desired functions characteristic to the organic material can be used. Specific examples thereof include functional organic molecules such as organic electroluminescence material molecules, organic electrically conductive material molecules, organic photoelectric conversion material molecules, organic dye material molecules, organic sensing material molecules, organic light modulating material molecules, and organic magnetic material molecules. More specific examples thereof include arylamine derivatives, triazole derivatives, pyrrole derivatives, thiophene derivatives, phenanthroline derivatives, metal complexes, acetylene derivatives, diacetylene derivatives, metal ion coordinated organic compounds, fused polycyclic hydrocarbon derivatives, carboxylic acid derivatives, organic selenium compounds, carbon fluoride-based compounds, and acyclic hydrocarbon compounds. Furthermore, organic molecules derived from organisms, such as protein, membrane protein, and DNA, in particular, biomolecules and organic molecules constituting living bodies, also can be used. When organic molecules that do not chemically bond with the base material are selected as the second organic molecules, the second organic molecules can be caused to be present inside the monomolecular film uniformly in the thickness direction of the monomolecular film.

In order to cause the second organic molecules to be present securely inside the monomolecular film, the first organic molecules and the second organic molecules may be selected so that the functional groups of the first organic molecules and the functional groups of the second organic molecules interact with each other. Examples of the interaction include covalent bonding, a charge-charge interaction, a charge transfer interaction, a charge-dipole interaction, a dipole-dipole interaction, hydrogen bonding, and a hydrophobic interaction. In a case where the second organic molecules are caused to be present inside by a charge-charge interaction, for example, diethylphosphate ethyltriethoxysilane may be used as the first organic molecules, and polyallylamine may be used as the second organic molecules. In a case where the second organic molecules are caused to be present inside by a charge transfer interaction, for example, 1-triethoxysilylpropylamino-2-methylanthraquinone may be used as the first organic molecules, and hydroquinone may be used as the second organic molecules. In a case where the second organic molecules are caused to be present inside by a charge-dipole interaction, for example, 5-aminopentyltrimethoxysilane may be used as the first organic molecules, and aspartic acid may be used as the second organic molecules. In a case where the second organic molecules are caused to be present inside by a dipole-dipole interaction, for example, 8-(para-cyanophenyl)octyltrichlorosilane may be used as the first organic molecules, and fluorine-substituted benzoic acid may be used as the second organic molecules. In a case where the second organic molecules are caused to be present inside by hydrogen bonding, for example, acetoxyhexyltrimethoxysilane may be used as the first organic molecules, and oleic acid may be used as the second organic molecules. In a case where the second organic molecules are caused to be present inside by a hydrophobic interaction, for example, nonadecyltrichlorosilane may be used as the first organic molecules, and hexadecane may be used as the second organic molecules. In a case where both the first organic molecules and the second organic molecules have aromatic rings, the second organic molecules can be caused to be present securely inside the monomolecular film because a π-π interaction is obtained with the aromatic rings being stacked. Specific examples in which the second organic molecules are caused to be present inside by a π-π interaction or by covalent bonding will be described later.

There is no specific limitation on the thickness of the monomolecular film, but the thickness preferably is 0.5 to 20 nm in order to secure both strength and thinness. Further, the film thickness may be larger. For example, according to the methods disclosed in JP H10-175267A, JP H7-48459A, JP H4-132637A, a film with a thickness of greater than 20 nm can be formed.

In the organic molecular film structure obtained by the present invention, the ratio between the number of the first organic molecules and the number of the second organic molecules (first organic molecules/second organic molecules) is, for example, approximately 0.05 to 1.5. Furthermore, the density of the first organic molecules in the monomolecular film (the area occupied by one molecule) preferably is approximately 0.40 to 12 $nm^2$/molecule. The reason for this is that the second organic molecules more easily can be caused to be present inside.

The method of the present invention further may comprise a step of chemically bonding the second organic molecules, the step being performed after step ii). The reason for this is that, for example, when the second organic molecules are polymerized, functional polymers can be caused to be present inside the monomolecular film. The bonding between the base material and the first organic molecules in this case preferably is covalent bonding, for example, in the form of —Si—O— as described above. The reason for this is that, in the case of covalent bonding, the monomolecular film can be prevented from being separated from the base material during a chemical reaction occurring when the second organic molecules are chemically bonded.

In a case where the second organic molecules are monomers constituting electrically conductive polymers, such as thiophene derivatives, pyrrole derivatives, or diacetylene derivatives, the second organic molecules can be polymerized, for example, by catalyst polymerization, electrolytic polymerization, or ultraviolet polymerization. Accordingly, an organic molecular film provided with electrical conductivity can be formed. Application of this sort of organic molecular film to capacitors, cells, and the like can be expected.

Furthermore, development of this sort of organic molecular film in flexible and light devices is conceivable. Examples of the devices include organic thin film sensors such as a biosensor and a pressure sensor, a wireless tag, an organic thin film transistor, an organic thin mm solar cell, and an imaging film. Furthermore, a polymer containing a thiophene derivative emits light, and thus development of this polymer in organic light-emitting elements used in televisions, displays, and other display apparatuses can be expected.

The method of the present invention further may comprise a step of chemically bonding the first organic molecules and the second organic molecules, the step being performed after step ii). The reason for this is that when the first organic molecules and the second organic molecules are bonded strongly, for example, an organic molecular film with high solvent resistance can be provided.

The method of the present invention further may comprise a step of chemically bonding the second organic molecules and chemically bonding the first organic molecules and the second organic molecules, the step being performed after step ii). The reason for this is that, for example, when the second organic molecules are polymerized, functional polymers can be caused to be present inside the monomolecular film, and when the first organic molecules and the second organic molecules are bonded strongly, for example, an organic molecular film with high solvent resistance can be provided. For example, in a case where the first organic molecules contain monomers constituting electrically conductive polymers as functional groups, and the second organic molecules are monomers constituting electrically conductive polymers, the chemical bonding (covalent bonding) between the second organic molecules and the chemical bonding (covalent bonding) between the first organic molecules and the second organic molecules simultaneously can be obtained by the above-described polymerization.

The method of the present invention further may comprise a step of removing the second organic molecules deposited on the monomolecular film, the step being performed after step ii). The reason for this is that when excessive second organic molecules are removed, for example, the organic molecular film can be formed thinner. There is no specific limitation on the step of removing the second organic molecules in this case. Examples of the step include a step of eluting the second organic molecules using a solvent in which the second organic molecules can be dissolved, a step of volatilizing the second organic molecules by heating the monomolecular film, a step of decomposing the second organic molecules by irradiating the monomolecular film with ultraviolet rays or the like, and a step of causing an absorbent to absorb the second organic molecules. Also, the step of removing the second organic molecules may be a step of dissolving the second organic molecules, a step of extracting the second organic molecules, a step of diluting the second organic molecules, or the like.

Next, an organic molecular film structure of the present invention will be described. It should be noted that the organic molecular film structure of the present invention is an organic molecular film structure obtained by the above-described organic molecular film structure forming method of the present invention. Thus, a description of the same contents as those described above will be omitted.

The organic molecular film structure of the present invention is an organic molecular film structure containing a base material and an organic molecular film that is formed on the base material, wherein the organic molecular film contains a monomolecular film that contains first organic molecules chemically bonded to a surface of the base material, and second organic molecules that are present inside the monomolecular film. Thus, as described above, it is possible to provide an organic molecular film that can maintain desired functions characteristic to the organic material and that can be realized as a thin film. Moreover, it is possible to reduce the cost for producing the organic molecular film because a function for realizing a thin film and desired functions characteristic to the organic material do not have to be provided in the same organic molecules as in conventional examples. Furthermore, it is possible to provide an organic molecular film that easily can be realized as a thin film and has a uniform thickness, because a monomolecular film is contained. When a region made of materials that repel the second organic molecules is placed around the monomolecular film that contains the first organic molecules, the second organic molecules can be prevented from spilling out of the monomolecular film.

Hereinafter, an embodiment of the present invention will be described with reference to the drawings. FIGS. 1A to 1E that are to be referred to are cross-sectional views following the processing procedure, for illustrating an organic molecular film structure forming method according to an embodiment of the present invention.

First, as shown in FIG. 1A, a base material 10 is provided. The base material 10 may be made of, for example, glass, metals, ceramics, resins, or their compound materials. Furthermore, the shape of the base material 10 is not limited to a plate, and it may be a film, a block, a line, a combination of these shapes, or a shape with a curved face. Also, the base material 10 may be a cylindrical member having an opening portion, a porous member having open pores, or the like. In a case where the surface of the base material 10 is dirty, there is a possibility that a monomolecular film 12 (see FIG. 1C) cannot be formed, and thus the surface preferably is washed in advance. Examples of washing means include a washing method using pure water, ultrapure water, or the like, a washing method using a commonly used solvent (e.g., acetone and the like), a washing method using ultrasonic waves, a washing method using active oxygen, and a method for oxidizing the surface. In a case where the base material 10 is made of a resin, if a solvent is used, the resins components are, for example, dissolved or swollen. Thus, the surface is washed preferably by the washing method using active oxygen or the method for oxidizing the surface. This configuration is preferable for forming the monomolecular film 12 (see FIG. 1C) because active hydrogen is exposed on the surface of the resin at that time.

Figure 1B:
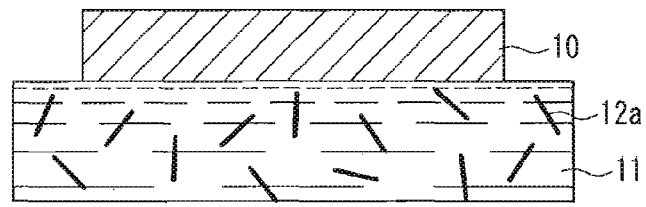
Figure 1C:

Next, a solution 11 in which first organic molecules 12a are dissolved and the base material 10 are brought into contact with each other as shown in FIG. 1B, and thus the surface of the base material 10 and the first organic molecules 12a are chemically bonded. Accordingly, the monomolecular film 12 that contains the first organic molecules 12a is formed as shown in FIG. 1C.

Figure 1D:
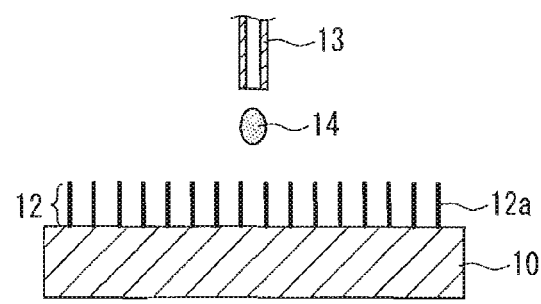
Figure 1E:
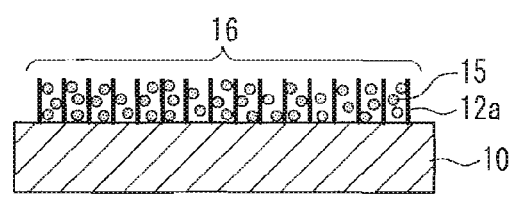

Next, a solution 14 in which second organic molecules 15 (see FIG. 1E) are dissolved is dripped onto the monomolecular film 12 using a dripping apparatus 13 as shown in FIG. 1D, and thus the second organic molecules 15 are caused to be present inside the monomolecular film 12. Accordingly, an organic molecular film 16 in which the second organic molecules 15 are present inside the monomolecular film 12 is obtained as shown in FIG. 1E. Herein, the organic molecular film structure of the present invention contains the base material 10 and the organic molecular film 16 that is formed on the base material 10, for example, as shown in FIG. 1E.

Hereinafter, examples of the present invention will be described together with comparative examples. It should be noted that the present invention is not limited to the following examples.

EXAMPLE 1

First, an aluminum substrate manufactured by Matsunami Glass Ind., Ltd. was prepared in which aluminum was deposited to a thickness of 200 μm on a glass substrate. The aluminum surface of this aluminum substrate and a 1 wt % solution of nonadecenyltrichlorosilane manufactured by Shin-Etsu Chemical Co., Ltd. (solvent: silicone oil KF-96 manufactured by Shin-Etsu Chemical Co., Ltd., temperature: 25° C.) were brought into contact with each other under a dry atmosphere for 10 minutes, and then the obtained monomolecular film was washed with the same silicone oil as the solvent of the solution. As a result, a self-assembled monolayer of nonadecenyltrichlorosilane was formed on the aluminum substrate. After the self-assembled monolayer was formed, the thickness was measured using a scanning probe microscope. The thickness was approximately 1 nm (substantially the same as the molecular length of nonadecenyltrichlorosilane).

Part of the formed self-assembled monolayer of nonadecenyltrichlorosilane was sampled, and the static contact angle of this self-assembled monolayer with respect to hexadecane was measured. The measurement was performed using an automatic contact angle meter manufactured by Kyowa Interface Science Co., Ltd. The static contact angle measured after approximately 4 μL of hexadecane was dripped onto the self-assembled monolayer was 25.0 degrees (23° C.) on average across measurement locations (6 locations).

Next, a hexadecane solution (a solution in which 1 g of hexadecane was diluted with 50 mL of chloroform) was dripped onto the self-assembled monolayer using a spin coating method, and thus an organic molecular film of Example 1 was obtained in which hexadecane was present inside the self-assembled monolayer. The rotational speed of the aluminum substrate at the time of spin coating was 1500 rpm.

Next, the amount of hexadecane present inside the organic molecular film of Example 1 was estimated based on the measurement of infrared absorption spectra. The measurement was performed using a Fourier infrared spectroscope manufactured by Nicolet, to which an RAS (reflection absorption spectroscopy) jig was attached, for a total of 500 runs. Table 1 shows the results. The absorption intensity area in the table refers to the area of absorption resulting from the vibrations (antisymmetric stretching vibrations and symmetric stretching vibrations) of $CH_2$ groups and $CH_3$ groups in a wavenumber range of 3000 to 2765. Herein, as the values of the absorption intensity area in the table, values obtained by subtracting measured values of the monomolecular film (blank) containing only the self-assembled monolayer from measured values of the organic molecular film inside which hexadecane was caused to be present are shown because the self-assembled monolayer also exhibited infrared absorption in the same wavenumber region. The number of $CH_2$ groups in nonadecenyltrichlorosilane is 19 and the number of $CH_2$ groups in hexadecane is 16. Thus, it is expected that the absorption intensity in infrared absorption spectra of hexadecane is smaller by approximately 15% than that of nonadecenyltrichlorosilane. At the time of measurement, the substrate temperature was changed from 25° C. (room temperature) to 50° C., 60° C., 75° C., 90° C., and 105° C., and a change in absorption intensity at that time was observed. The substrates were heated to the respective temperatures for 45 minutes, and the measurement was performed after the heated substrates were allowed to stand for a sufficient length of time to cool down to 25° C. In the following examples and comparative examples, the heating duration and the measurement timing were the same as those described above.

TABLE 1

| Heating temperature | Absorption intensity area (a.u.) |
| --- | --- |
| 25° C. | 36.184 |
| 50° C. | 21.651 |
| 60° C. | 1.302 |
| 75° C. | 0.143 |
| 90° C. | 0.077 |
| 105° C. | 0.075 |

As shown in Table 1, after the substrate was heated to 90° C. and 105° C., hexadecane with substantially the same absorption intensity area as that (0.088) of the self-assembled monolayer was observed. Considering that the thickness of the self-assembled monolayer was 1 nm, which is substantially the same as the molecular length of nonadecenyltrichlorosilane, and that hexadecane exhibits absorption intensity smaller by approximately 15% than that of nonadecenyltrichlorosilane, as described above, it is assumed that the number of nonadecenyltrichlorosilane molecules in the self-assembled monolayer and the number of hexadecane molecules that were present inside were in a ratio of approximately 1:1 after the substrate was heated to 90° C. and 105° C.

Figure 2:
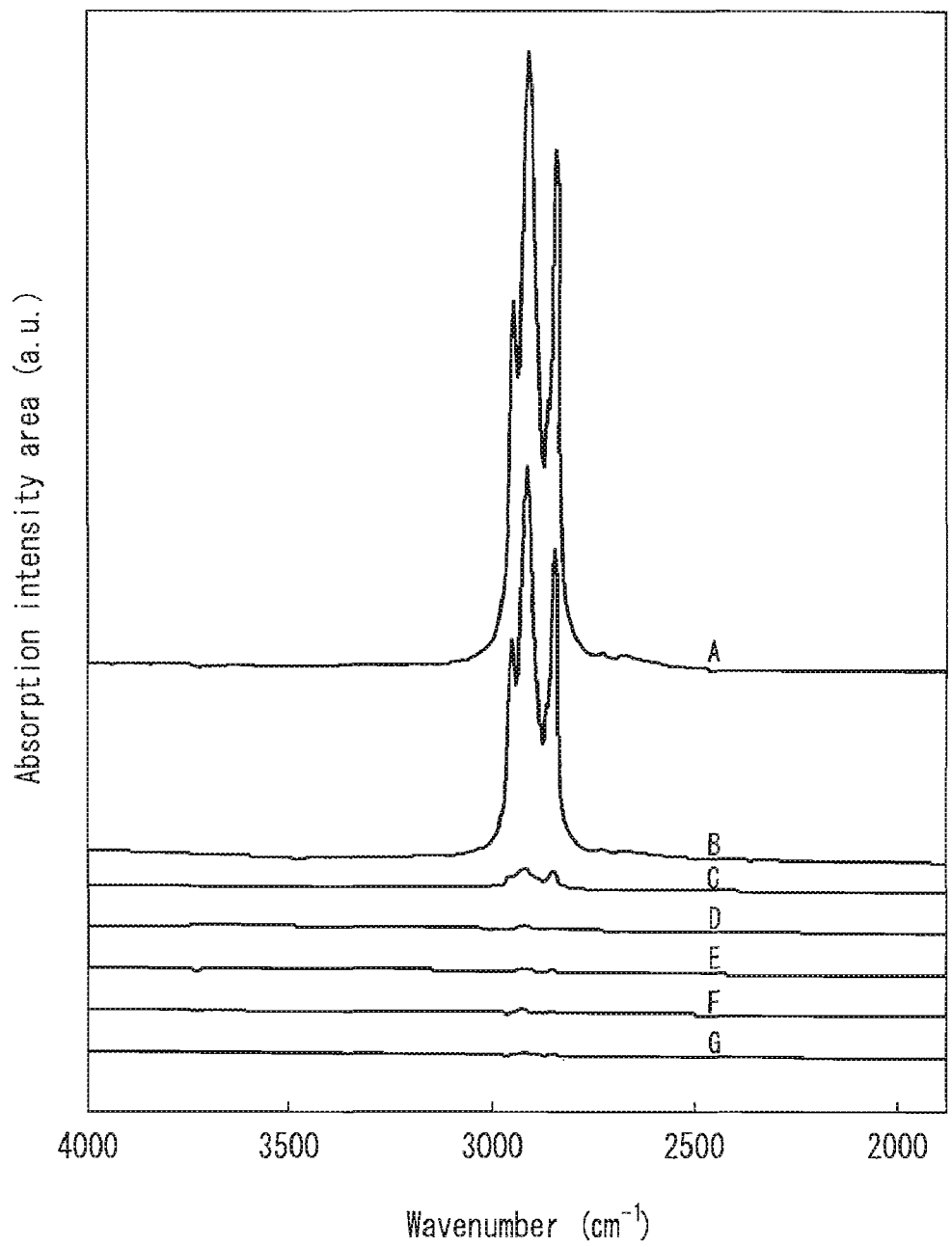
FIG. 2 shows infrared absorption spectra A to F in a wavenumber range of 3000 to 2765 of the organic molecular film of Example 1 and an infrared absorption spectrum G in a wavenumber range of 3000 to 2765 of a self-assembled monolayer containing nonadecenyltrichlorosilane.

FIG. 2 shows spectrum data from which values in Table 1 were obtained. A to F in FIG. 2 represent infrared absorption spectra in a wavenumber range of 3000 to 2765 of the organic molecular film of Example 1. The infrared absorption spectra A to F respectively correspond to a measurement result obtained in a case where the substrate was kept at 25° C., a measurement result obtained after the substrate was heated to 50° C., a measurement result obtained after the substrate was heated to 60° C., a measurement result obtained after the substrate was heated to 75° C., a measurement result obtained after the substrate was heated to 90° C., and a measurement result obtained after the substrate was heated to 105° C. As shown in FIG. 2, the absorption intensity gradually is smaller from A to F. This result suggests that the interaction at that time was a hydrophobic interaction resulting from alkyl chains. G in FIG. 2 represents an infrared absorption spectrum (substrate temperature: 25° C.) in a wavenumber range of 3000 to 2765 of the self-assembled monolayer.

EXAMPLE 2

As the organic molecular film of Example 2, an organic molecular film was formed as in Example 1 above, except that a self-assembled monolayer was formed using a solution with a concentration of a hundredth of that of the nonadecenyltrichlorosilane solution used for forming the film of Example 1 (that is, using a 0.01 wt % solution of nonadecenyltrichlorosilane). After the self-assembled monolayer was formed, the thickness was measured using a scanning probe microscope. The thickness was approximately 1 nm (substantially the same as the molecular length of nonadecenyltrichlorosilane). Table 2 shows the absorption intensity areas of infrared absorption spectra of Example 2 measured as in Example 1 above. Although not shown in Table 2, the absorption intensity area of the monomolecular film (blank) containing only the self-assembled monolayer in this case was 0.005. Since the absorption intensity area of the monomolecular film containing only the self-assembled monolayer in Example 1 was 0.088, it is seen that the molecular density of the self-assembled monolayer in Example 2 was approximately 5% of that in Example 1.

TABLE 2

| Heating temperature | Absorption intensity area (a.u.) |
| --- | --- |
| 25° C. | 74.99 |
| 50° C. | 14.829 |
| 75° C. | 0.059 |

As shown in Table 2, after the substrate was heated to 75° C., the absorption intensity area was 0.059. Based on this result and the fact that the absorption intensity area of the monomolecular film containing only the self-assembled monolayer was 0.005, it is assumed that the number of nonadecenyltrichlorosilane molecules in the self-assembled monolayer and the number of hexadecane molecules that were present inside were in a ratio of approximately 1:10 after the substrate was heated to 75° C.

COMPARATIVE EXAMPLE 1

For the sake of comparison with Examples 1 and 2, a film in which hexadecane was placed on an aluminum substrate as in Example 1 was formed without forming a self-assembled monolayer (Comparative Example 1). Table 3 shows the absorption intensity areas of infrared absorption spectra of Comparative Example 1 measured as in Example 1 above.

TABLE 3

| Heating temperature | Absorption intensity area (a.u.) |
| --- | --- |
| 25° C. | 38.829 |
| 50° C. | 9.713 |
| 60° C. | <0.0001 |
| 75° C. | <0.0001 |

As shown in Table 3, in a case where the substrate was kept at 25° C., infrared absorption was observed. However, after the substrate was heated to 50° C., the absorption intensity area was smaller than those in Examples 1 and 2. After the substrate was heated to 60° C. or greater, the absorption intensity area was smaller than the measuring limit. Based on the comparison between the absorption intensity areas in this result and in Examples 1 and 2, it is seen that hexadecane is caused to be present stably inside due to the presence of the self-assembled monolayer.

COMPARATIVE EXAMPLE 2

As the organic molecular film of Comparative Example 2, an organic molecular film was formed as in Example 1 above, except that a 1 wt % solution of (heptadecafluoro-1,1,2,2-tetrahydrodecyl)trichlorosilane manufactured by Shin-Etsu Chemical Co., Ltd. (solvent: perfluorocarbon PF5080 manufactured by Sumitomo 3M Limited) was used instead of the solution used for forming the self-assembled monolayer of Example 1. After a self-assembled monolayer containing (heptadecafluoro-1,1,2,2-tetrahydrodecyl)trichlorosilane was formed, the thickness was measured using a scanning probe microscope. The thickness was approximately 1 nm (substantially the same as the molecular length of (heptadecafluoro-1,1,2,2-tetrahydrodecyl)trichlorosilane). Table 4 shows the absorption intensity areas of infrared absorption spectra of Comparative Example 2 measured as in Example 1 above. Part of the formed self-assembled monolayer of (heptadecafluoro-1,1,2,2-tetrahydrodecyl)trichlorosilane was sampled, and the static contact angle of this self-assembled monolayer with respect to hexadecane was measured. The measurement was performed using an automatic contact angle meter manufactured by Kyowa Interface Science Co., Ltd. The static contact angle measured after approximately 4 μL of hexadecane was dripped onto the self-assembled monolayer was 63.9 degrees (23° C.) on average across measurement locations (6 locations).

TABLE 4

| Heating temperature | Absorption intensity area (a.u.) |
|---|---|
| 25° C. | <0.0001 |
| 50° C. | <0.0001 |
| 60° C. | <0.0001 |
| 75° C. | <0.0001 |

As shown in Table 4, no peak resulting from hexadecane was observed. Thus, it was found difficult to form an organic molecular film inside which hexadecane is present using a combination of these substances. The reason for this seems to be that $CF_2$ groups and $CF_3$ groups of organic molecules forming the self-assembled monolayer and hexadecane hardly interact with each other.

COMPARATIVE EXAMPLE 3

As the organic molecular film of Comparative Example 3, an organic molecular film was formed as in Comparative Example 2, except that a self-assembled monolayer was formed using a solution with a concentration of a hundredth of that of the solution used for forming the film of Comparative Example 2 (that is, using a 0.01 wt % solution of (heptadecafluoro-1,1,2,2-tetrahydrodecyl)trichlorosilane). Table 5 shows the absorption intensity areas of infrared absorption spectra of Comparative Example 3 measured as in Example 1 above.

TABLE 5

| Heating temperature | Absorption intensity area (a.u.) |
|---|---|
| 25° C. | <0.0001 |
| 50° C. | <0.0001 |
| 60° C. | <0.0001 |
| 75° C. | <0.0001 |

As shown in Table 5, no peak resulting from hexadecane was observed in Comparative Example 3 as in the case of Comparative Example 2. Thus, it was found difficult to form an organic molecular film inside which hexadecane is present using a combination of these substances.

EXAMPLE 3

As the organic molecular film of Example 3, an organic molecular film was formed as in Example 1, except that a different solution was dripped onto a self-assembled monolayer containing nonadecenyltrichlorosilane. In Example 3, as this solution, a solution of heptafluorobutyric acid manufactured by Sigma-Aldrich (a solution in which 1 g of heptafluorobutyric acid was diluted with 50 mL of chloroform) was used. After the self-assembled monolayer was formed, the thickness was measured using a scanning probe microscope. The thickness was approximately 1 nm (substantially the same as the molecular length of nonadecenyltrichlorosilane).

Next, the amount of heptafluorobutyric acid present inside the organic molecular film of Example 3 was estimated based on the measurement of infrared absorption spectra. The measurement was performed using a Fourier infrared spectroscope manufactured by Nicolet, to which an RAS jig was attached, for a total of 500 runs. Table 6 shows the results. The absorption intensity area in the table refers to the area of absorption resulting from the stretching vibrations of CO in COOH groups of heptafluorobutyric acid in a wavenumber range of 1900 to 1530. Herein, as the values of the absorption intensity area in the table, values obtained by subtracting measured values of the monomolecular film (blank) containing only the self-assembled monolayer from measured values of the organic molecular film inside which heptafluorobutyric acid was caused to be present are shown because the self-assembled monolayer also exhibited infrared absorption in the same wavenumber region.

TABLE 6

| Heating temperature | Absorption intensity area (a.u.) |
|---|---|
| 25° C. | 0.1485 |
| 50° C. | 0.1416 |
| 70° C. | 0.1212 |
| 100° C. | 0.0557 |

As shown in Table 6, even after the substrate was heated to 100° C., an infrared absorption spectrum (absorption intensity area: 0.0557) indicating the presence of heptafluorobutyric acid was observed. In Example 3, it is particularly notable that the spectrum suggesting the presence of heptafluorobutyric acid was observed even after the substrate was heated to 100° C., which is close to the boiling point of heptafluorobutyric acid. This phenomenon suggests that the self-assembled monolayer and heptafluorobutyric acid strongly interacted with each other.

Figure 3:
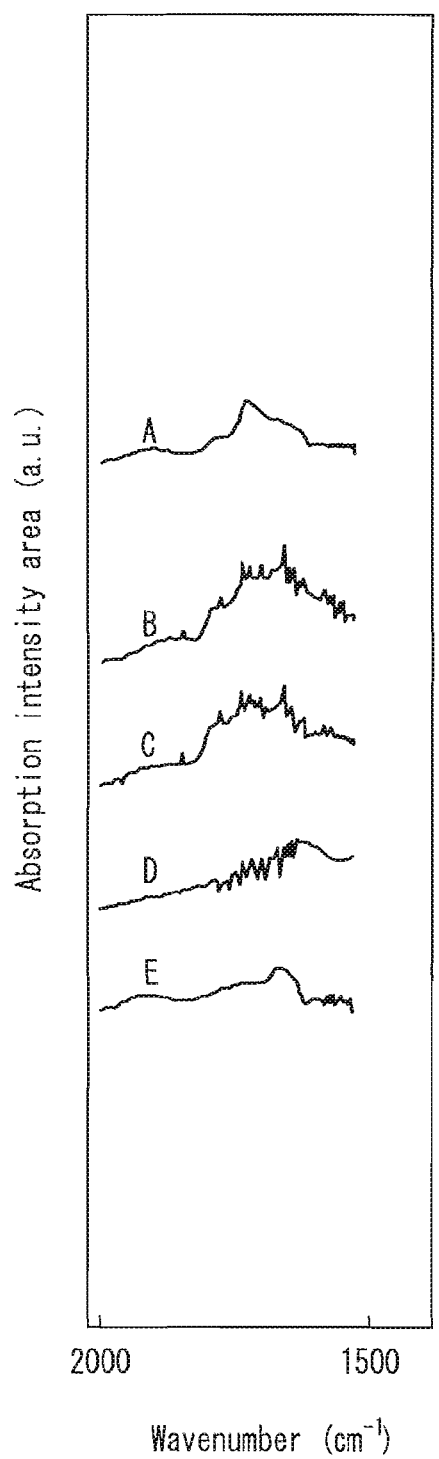
FIG. 3 shows infrared absorption spectra A to D in a wavenumber range of 1900 to 1530 of the organic molecular film of Example 3 and an infrared absorption spectrum E in a wavenumber range of 1900 to 1530 of a self-assembled monolayer containing nonadecenyltrichlorosilane.

FIG. 3 shows spectrum data from which values in Table 6 were obtained. A to D in FIG. 3 represent infrared absorption spectra in a wavenumber range of 1900 to 1530 of the organic molecular film of Example 3. The infrared absorption spectra A to D respectively correspond to a measurement result obtained in a case where the substrate was kept at 25° C., a measurement result obtained after the substrate was heated to 50° C., a measurement result obtained after the substrate was heated to 70° C., and a measurement result obtained after the substrate was heated to 100° C. As shown in FIG. 3, the absorption intensity gradually is smaller from A to D. E in FIG. 3 represents an infrared absorption spectrum (substrate temperature: 25° C.) in a wavenumber range of 1900 to 1530 of the self-assembled monolayer.

Figure 4:
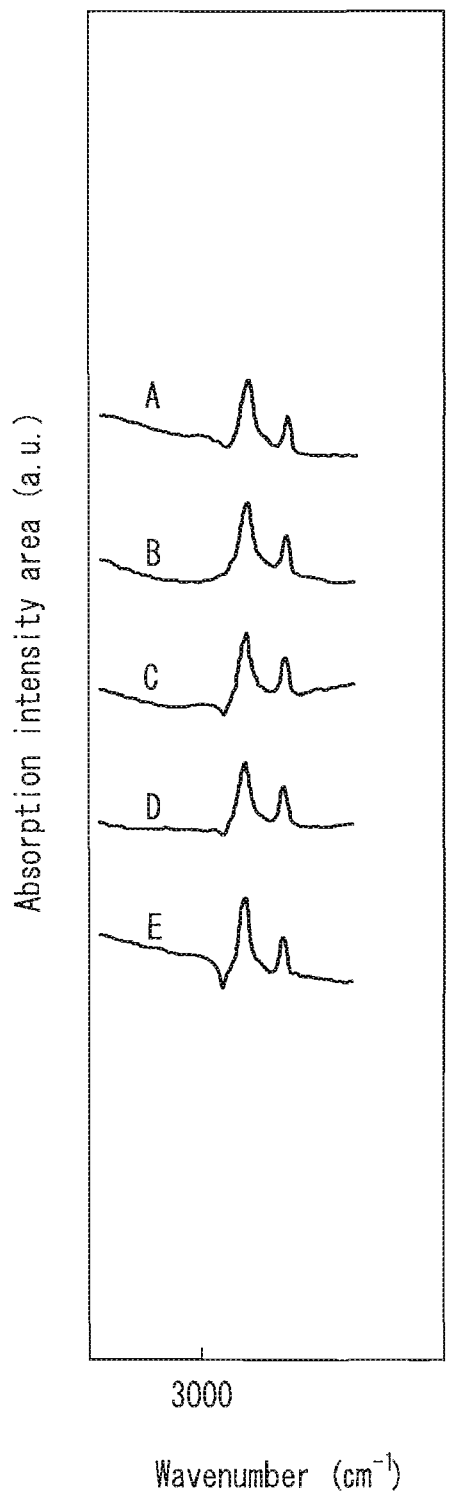
FIG. 4 shows infrared absorption spectra A to D at a wavenumber of around 3000 of the organic molecular film of Example 3 and an infrared absorption spectrum E at a wavenumber of around 3000 of a self-assembled monolayer containing nonadecenyltrichlorosilane.

A to D in FIG. 4 represent infrared absorption spectra (peaks resulting from nonadecenyltrichlorosilane) at a wavenumber of around 3000 of the organic molecular film of Example 3. The infrared absorption spectra A to D respectively correspond to a measurement result obtained in a case where the substrate was kept at 25° C., a measurement result obtained after the substrate was heated to 50° C., a measurement result obtained after the substrate was heated to 70° C., and a measurement result obtained after the substrate was heated to 100° C. E in FIG. 4 represents an infrared absorption spectrum (substrate temperature: 25° C.) at a wavenumber of around 3000 of the self-assembled monolayer. As shown in FIG. 4, no change was observed in the self-assembled monolayer containing nonadecenyltrichlorosilane after the substrate was heated to temperatures up to 100° C. Based on the results in FIGS. 3 and 4, it is seen that heptafluorobutyric acid was present inside the organic molecular film of Example 3.

EXAMPLE 4

As the organic molecular film of Example 4, an organic molecular film was formed as in Example 3 above, except that a self-assembled monolayer was formed using a solution with a concentration of a hundredth of that of the nonadecenyltrichlorosilane solution used for forming the self-assembled monolayer of Example 3 (that is, using a 0.01 wt % solution of nonadecenyltrichlorosilane). Table 7 shows the absorption intensity areas of infrared absorption spectra of Example 4 measured as in Example 3 above. After the self-assembled monolayer was formed, the thickness was measured using a scanning probe microscope. The thickness was approximately 1 nm (substantially the same as the molecular length of nonadecenyltrichlorosilane).

TABLE 7

| Heating temperature | Absorption intensity area (a.u.) |
|---|---|
| 25° C. | 0.0808 |
| 50° C. | 0.0613 |
| 70° C. | 0.0745 |
| 100° C. | <0.0001 |

As shown in Table 7, even after the substrate was heated to 70° C., the presence of heptafluorobutyric acid was observed. Accordingly, it is seen that heptafluorobutyric acid was present inside the organic molecular film of Example 4.

COMPARATIVE EXAMPLE 4

For the sake of comparison with Examples 3 and 4, a film in which heptafluorobutyric acid was placed on an aluminum substrate as in Example 3 was formed without forming a self-assembled monolayer (Comparative Example 4). Table 8 shows the absorption intensity areas of infrared absorption spectra of Comparative Example 4 measured as in Example 3 above.

TABLE 8

| Heating temperature | Absorption intensity area (a.u.) |
|---|---|
| 25° C. | 0.0392 |
| 50° C. | 0.0006 |
| 70° C. | <0.0001 |
| 100° C. | <0.0001 |

As shown in Table 8, after the substrate was heated to 70° C. or greater, the absorption intensity area of the infrared absorption spectrum for observing the presence of heptafluorobutyric acid was smaller than the measuring limit. Based on the comparison between the absorption intensity areas in this result and in Examples 3 and 4, it is seen that heptafluorobutyric acid stably is caused to be present inside due to the presence of the self-assembled monolayer.

EXAMPLE 5

As the organic molecular film of Example 5, an organic molecular film was formed as in Example 1, except that a self-assembled monolayer was constituted by different molecules and that a different solution was dripped onto the self-assembled monolayer. In Example 5, the self-assembled monolayer was formed as in Example 1, using a 1 wt % solution of ω-(3-thienyl)-decyl-trichlorosilane synthesized according to the method described in Japanese Patent No. 2889768 (solvent: a solvent in which hexadecane manufactured by Sigma-Aldrich and dehydrated chloroform manufactured by KANTO CHEMICAL CO., INC. were mixed in a ratio of 4:1 (volume ratio)). Furthermore, as the solution dripped onto the self-assembled monolayer, 2-propylthiophene manufactured by Sigma-Aldrich was used. After the self-assembled monolayer containing ω-(3-thienyl)-decyl-trichlorosilane was formed, the thickness was measured using a scanning probe microscope. The thickness was approximately 1 nm (substantially the same as the molecular length of ω-(3-thienyl)-decyl-trichlorosilane).

Next, the amount of 2-propylthiophene present inside the organic molecular film of Example 5 was estimated based on the measurement of infrared absorption spectra. The measurement was performed using a Fourier infrared spectroscope manufactured by Nicolet, to which an RAS jig was attached, for a total of 500 runs. Table 9 shows the results. Table 9 shows the areas of absorption (absorption intensity areas) resulting from thiophene rings in a wavenumber range of 740.5 to 680.7 (hereinafter, also referred to as the 'first wavenumber region'). Herein, as the values of the absorption intensity area in the table, values obtained by subtracting measured values of the monomolecular film (blank) containing only the self-assembled monolayer from measured values of the organic molecular film inside which 2-propylthiophene was caused to be present are shown because the self-assembled monolayer also exhibited infrared absorption in the same wavenumber region. In order to observe the state of the self-assembled monolayer, infrared absorption spectra (peaks resulting from ω-(3-thienyl)-decyl-trichlorosilane) in a wavenumber range of 3000 to 2765 (hereinafter, also referred to as the 'second wavenumber region') of the organic molecular film of Example 5 also were observed.

TABLE 9

| Heating temperature | Absorption intensity area (a.u.) (3000 to 2765 wavelength) | Absorption intensity area (a.u.) (740.5 to 680.7 wavelength) |
|---|---|---|
| 25° C. | 0.0402 | 0.0285 |
| 80° C. | 0.0281 | 0.0033 |
| 125° C. | 0.0228 | 0.0028 |
| 170° C. | 0.0248 | 0.0025 |

As shown in Table 9, in both the first and the second wavenumber regions in a case where the substrate was kept at 25° C., the absorption intensity area was greater than that in the same regions after heating was performed. This result suggests that 2-propylthiophene not only was present inside the self-assembled monolayer, but also deposited on the self-assembled monolayer. The absorption intensity area in the first wavenumber region after the substrate was heated to 80° C. was 0.0033, and this value substantially was not changed throughout states in which the substrate was heated to temperatures up to 170° C. In a case where heating was performed on the substrate to 80° C. or greater, the absorption intensity area in the second wavenumber region resulting from the self-assembled monolayer was not changed, and thus it seems that neither heating nor the process of causing 2-propylthiophene to be present inside caused a change in the self-assembled monolayer containing ω-(3-thienyl)-decyltrichlorosilane. Based on this result, it is seen that the organic molecular film of Example 5 was a thin film in which 2-propylthiophene was present inside the self-assembled monolayer containing ω-(3-thienyl)-decyl-trichlorosilane.

In Example 5, it is particularly notable that although the substrate was heated to a temperature equal to or higher than the boiling point of 2-propylthiophene, an infrared absorption spectrum indicating the presence of 2-propylthiophene that was present inside the self-assembled monolayer on the substrate was observed. This phenomenon seems to be based on an interaction (a hydrophobic interaction) between the long-chain alkyl group of ω-(3-thienyl)-decyl-trichlorosilane (the first organic molecules) constituting the self-assembled monolayer and the propyl group of 2-propylthiophene (the second organic molecules) and an interaction (a π-π interaction) between the thiophene ring of ω-(3-thienyl)-decyl-trichlorosilane and the thiophene ring of 2-propylthiophene. According to a material safety data sheet (MSDS) presented by Sigma-Aldrich, the boiling point of 2-propylthiophene is 159.5.

COMPARATIVE EXAMPLE 5

For the sake of comparison with Example 5, a thin film in which 2-propylthiophene was placed on an aluminum substrate as in Example 5 was formed without forming a self-assembled monolayer (Comparative Example 5). Table 10 shows the absorption intensity areas of infrared absorption spectra of Comparative Example 5 measured as in Example 5 above.

TABLE 10

| Heating temperature | Absorption intensity area (a.u.) (3000 to 2765 wavelength) | Absorption intensity area (a.u.) (740.5 to 680.7 wavelength) |
| --- | --- | --- |
| 25° C. | 0.0360 | 0.0251 |
| 80° C. | 0.0087 | <0.0001 |
| 125° C. | <0.0001 | <0.0001 |
| 170° C. | <0.0001 | <0.0001 |

As shown in Table 10, absorption in the second wavenumber region resulting from 2-propylthiophene was observed in a case where the substrate was kept at 25° C. After the substrate was heated to 80° C., the absorption intensity in the second wavenumber region was lowered, but an infrared absorption spectrum was observed. After the substrate was heated to 125° C. and to 170° C., no absorption in the second wavenumber region was observed.

No absorption in the first wavenumber region resulting from the thiophene ring of 2-propylthiophene after the substrate was heated to 80° C. or greater. Accordingly, it is seen that in a case where a self-assembled monolayer is not formed, 2-propylthiophene is evaporated by heating the substrate.

INDUSTRIAL APPLICABILITY

The organic molecular film structure of the present invention can be used in various functional molecular films, and application and development thereof in particular in electron devices are expected.

The invention claimed is:

1. An organic molecular film structure forming method for forming an organic molecular film on a base material, comprising the steps of:

i) forming on the base material a monomolecular film that contains first organic molecules by chemically bonding a surface of the base material and the first organic molecules; and ii) bringing second organic molecules, which contain at least one functional group that interacts with the first organic molecules in the monomolecular film, into contact with the first organic molecules in the monomolecular film, wherein at least one interaction occurs between the at least one functional group of the second organic molecules and at least one functional group of the first organic molecules, and the at least one interaction is at least one interaction selected from the group consisting of covalent bonding, a charge-charge interaction, a charge transfer interaction, a charge-dipole interaction, a dipole-dipole interaction, hydrogen bonding, and a hydrophobic interaction, and wherein the first organic molecules have at least one group selected from halogensilane groups, alkoxysilane groups, and alkene groups, whereby the second organic molecules are present between the first organic molecules in the monomolecular film.

2. The organic molecular film structure forming method according to claim 1, wherein the monomolecular film is a self-assembled monolayer of the first organic molecules.

3. The organic molecular film structure forming method according to claim 1, wherein in step i), the surface of the base material and the first organic molecules are bonded chemically by bringing a solution in which the first organic molecules are dissolved and the base material into contact with each other.

4. The organic molecular film structure forming method according to claim 1, wherein step i) is forming the monomolecular film selectively on part of the surface of the base material.

5. The organic molecular film structure forming method according to claim 1, wherein in step ii), the second organic molecules are caused to be present inside the monomolecular film by dripping the second organic molecules or a solution in which the second organic molecules are dissolved onto the monomolecular film.

6. The organic molecular film structure forming method according to claim 5, wherein the second organic molecules or the solution is dripped in a state where the monomolecular film is rotated.

7. The organic molecular film structure forming method according to claim 1, further comprising a step of chemically bonding the second organic molecules, the step being performed after step ii).

8. The organic molecular film structure forming method according to claim 1, further comprising a step of chemically bonding the first organic molecules and the second organic molecules, the step being performed after step ii).

9. The organic molecular film structure forming method according to claim 1, further comprising a step of chemically bonding the second organic molecules with the second organic molecules and chemically bonding the first organic molecules and the second organic molecules, the step being performed after step ii).

10. The organic molecular film structure forming method according to claim 1, further comprising a step of removing the second organic molecules deposited on the monomolecular film, the step being performed after step ii).

11. The organic molecular film structure forming method according to claim 10, wherein the step of removing the second organic molecules is at least one selected from a step of eluting the second organic molecules, a step of volatilizing the second organic molecules, a step of decomposing the second organic molecules, and a step of causing an absorbent to absorb the second organic molecules.

12. The organic molecular film structure forming method according to claim 1, wherein the first organic molecules include a halogenosilane group, and halogen of the halogenosilane group is at least one selected from chlorine, bromine and iodine.

13. The organic molecular film structure forming method according to claim 1, wherein the first organic molecules include an alkoxysilane group, and the alkoxysilane group is at least one selected from a methoxysilane group, an ethoxysilane group, and a butoxysilane group.

14. The organic molecular film structure forming method according to claim 1, wherein the first organic molecules include an alkene group, and the alkene group is present in the form of —CH=CH$_2$ at a distal end of the first organic molecules.

15. The organic molecular film structure forming method according to claim 1, wherein the monomolecular film has a thickness of 0.5 to 20 nm.

16. An organic molecular film structure forming method for forming an organic molecular film on a base material, comprising the steps of:

i) forming on the base material a monomolecular film that contains first organic molecules by chemically bonding a surface of the base material and the first organic molecules; and ii) bringing second organic molecules, which contain at least one functional group that interacts with the first organic molecules in the monomolecular film, into contact with the first organic molecules in the monomolecular film, wherein the monomolecular film is a self-assembled monolayer of the first organic molecules, and wherein at least one interaction occurs between the at least one functional group of the second organic molecules and at least one functional group of the first organic molecules, and the at least one interaction is at least one interaction selected from the group consisting of covalent bonding, a charge-charge interaction, a charge transfer interaction, a charge-dipole interaction, a dipole-dipole interaction, hydrogen bonding, and a hydrophobic interaction, whereby the second organic molecules are present between the first organic molecules in the monomolecular film.

* * * * *